United States Patent
Dumont et al.

(10) Patent No.: US 7,271,847 B2
(45) Date of Patent: Sep. 18, 2007

(54) VIDEO APPARATUS WITH PICTURE-IN-PICTURE ABILITY

(75) Inventors: Frank Dumont, Singapore (SG); Chee Lam Tan, Singapore (SG); Steven Anthony Barron, Singapore (SG)

(73) Assignee: Thomson Licensing, Boulogne-Billancourt (FR)

( * ) Notice: Subject to any disclaimer, the term of this patent is extended or adjusted under 35 U.S.C. 154(b) by 1092 days.

(21) Appl. No.: 10/187,677

(22) Filed: Jul. 2, 2002

(65) Prior Publication Data

US 2003/0007097 A1    Jan. 9, 2003

(30) Foreign Application Priority Data

Jul. 5, 2001    (EP)    ................................. 01401796

(51) Int. Cl.
*H04N 5/45*    (2006.01)
*H04N 5/268*    (2006.01)
*H04N 5/76*    (2006.01)
*H04N 7/00*    (2006.01)

(52) U.S. Cl. .......................... 348/565; 348/705; 386/46

(58) Field of Classification Search ................ 348/572, 348/573, 570, 565, 705; 386/46
See application file for complete search history.

(56) References Cited

U.S. PATENT DOCUMENTS

| | | | |
|---|---|---|---|
| 4,992,874 A | | 2/1991 | Willis et al. |
| 5,040,067 A | | 8/1991 | Yamazaki ................. 358/183 |
| 5,113,259 A | * | 5/1992 | Romesburg et al. ........ 348/565 |
| 5,671,019 A | * | 9/1997 | Isoe et al. ................. 348/565 |
| 5,982,433 A | * | 11/1999 | Kim ....................... 375/240.01 |
| 6,011,594 A | * | 1/2000 | Takashima ................. 348/565 |
| 6,025,884 A | * | 2/2000 | Choi ......................... 348/565 |
| 6,061,719 A | * | 5/2000 | Bendinelli et al. ......... 709/218 |
| 6,229,951 B1 | | 5/2001 | Schultz et al. .............. 386/68 |
| 6,493,038 B1 | * | 12/2002 | Singh et al. ............... 348/565 |
| 6,732,371 B1 | * | 5/2004 | Lee et al. .................... 725/41 |

* cited by examiner

*Primary Examiner*—Thai Tran
*Assistant Examiner*—Nigar Chowdhury
(74) *Attorney, Agent, or Firm*—Joseph J. Laks; Robert D. Shedd; Brian J. Cromarty

(57) ABSTRACT

A video apparatus, for instance a video player, comprises a first digital source (e.g. a media player) of a first video digital stream and a video encoder (for generating analogue video signals based on said first video digital stream. The video apparatus also has an input for receiving first analogue video signals comprising synchronization signals.

A second digital source generates a second video digital stream based on which the video encoder can generate second analogue video signals synchronized by the synchronization signals of the first analogue video signals for superimposition on the first analogue video signals.

10 Claims, 1 Drawing Sheet

VIDEO APPARATUS WITH PICTURE-IN-PICTURE ABILITY

FIELD OF THE INVENTION

The invention relates to a video apparatus with picture-in-picture ability.

BACKGROUND OF THE INVENTION

Video apparatus nowadays use video information from digital sources. For instance, a video player reads video information from digital media where the information is previously digitally recorded. Such a digital medium is for instance a tape recorded according to the D-VHS standard, a hard-disk drive (HDD) or an optical disc (like DVD) where a program stream is recorded. (As another example for a video apparatus with digital source, a set-top box receives a digital stream from a digital front-end including tuner and demodulator.)

Such a video player mainly comprises a media player (digital source) to read (or reproduce) the video digital stream from the medium and a video encoder to generate an analogue video signal from the video digital stream (i.e. to convert the digital stream into an analogue signal according to a known standard like CVBS-PAL, SECAM or NSTC, S-Video or RGB). The analogue video signal is then ready to be displayed for instance by a conventional TV set. An example of such a video apparatus is described for instance in U.S. Pat. No. 6,229,951.

Some video apparatus can display two video sequences at the same time in a picture-in-picture (PIP) fashion: a first video sequence is displayed on a first part of the screen, generally on the whole screen (the first video sequence is then called the parent image), and a second video sequence is displayed on a second part of the screen, generally superimposed on the first video sequence on a limited part of the screen (whereby the second video sequence is called the child picture).

To realise such a PIP function, known video apparatus have two video sources and at least a specific video circuit for reduction of the size of the video source used as a second video sequence (child picture), as described in patent application EP 0 406 698.

SUMMARY OF THE INVENTION

The invention seeks notably to provide a video apparatus, as the one disclosed in U.S. Pat. No. 6,229,951, with a PIP function which needs no additional specific video circuit.

The invention proposes a video apparatus comprising a first digital source of a first video digital stream and a video encoder for generating analogue video signals based on said first video digital stream characterised by an input for receiving first analogue video signals comprising synchronisation signals and a second digital source of a second video digital stream, the video encoder having means to generate second analogue video signals based on said second video digital stream and synchronised by said synchronisation signals.

According to preferred embodiments said second analogue video signals are output for superimposition on said first analogue video signals;

said first analogue video signals are output on a CVBS pin of a Scart connector and said second analogue video signals are output on RGB pins of the Scart connector;

said first digital source is a media player;

the video encoder comprises means for scaling down said video digital stream into said second analogue video signals;

said second digital source is a digital encoder;

said digital encoder converts an analogue video signal into said second video digital stream;

said digital encoder receives a digital stream from a DV camera or a set-top box;

a micro-controller provides said second digital source;

the micro-controller generates said second video digital stream based on data received from a modem or a serial bus.

The invention therefore notably proposes a video player comprising a media player generating a first video digital stream and a video encoder for generating analogue video signals based on said first video digital stream, characterised by an input for receiving first analogue video signals comprising synchronisation signals, by a Scart connector with a CVBS pin connectable to said input, and by a second digital source of a second video digital stream, wherein the video encoder has means to generate second analogue video signals based on said second video digital stream and synchronised by said synchronisation signals, and wherein said second analogue video signals are output on RGB pins of the Scart connector.

BRIEF DESCRIPTION OF THE DRAWING

The invention and other features thereof will be understood in the light of the following description made with reference to the attached drawing where.

Figure 1:
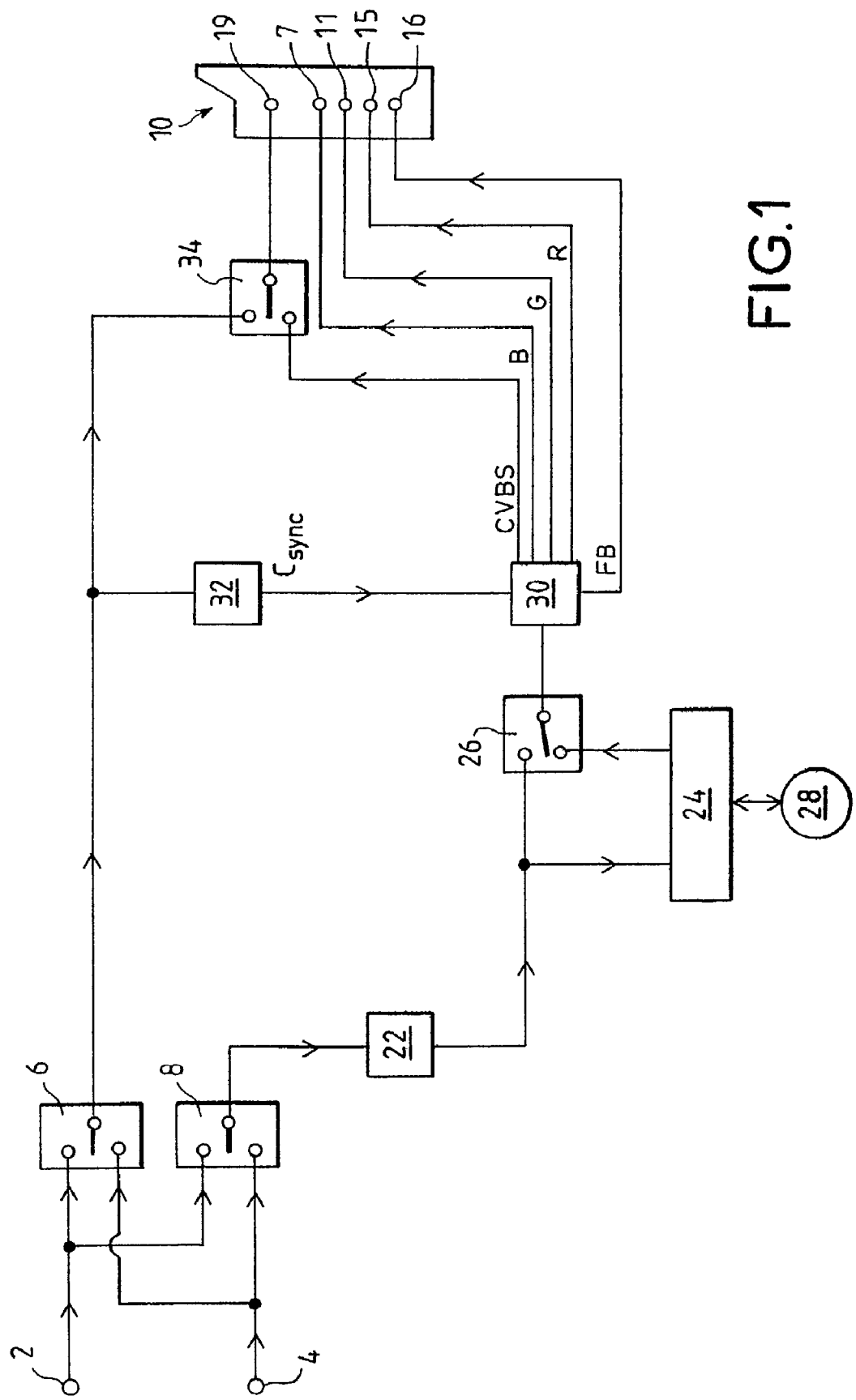
FIG. 1 represents a video apparatus realised according to the teachings of the invention.

The arrows in the figures are meant to represent the direction of the flow of information.

DETAILED DESCRIPTION OF PREFERED EMBODIMENTS

The video apparatus of FIG. 1 is a video player and recorder, generally referred to as video recorder, for instance a DVD-recorder. This video apparatus comprises a first input pin 2 and a second input pin 4. Each input pin 2, 4 is meant to receive a analogue video signal, for instance according to the CVBS format.

The wording "input pin" or "input" is meant to designate a part of the video apparatus receiving video signals; however, it is pointed out that these video signals can be incoming from other circuits in the video apparatus, for instance a tuner-and-demodulator entity (sometimes called front-end), as well as from external systems via a connector.

A first input selector 6 is connected to the first input pin 2 and the second input pin 4. The first input selector 6 is a switch controlled by a microprocessor (not shown) according to instructions from the user in order to selectively output the signal from the first input pin 2 or from the second input pin 4 as a main analogue video signal.

A second input selector 8 is similarly connected to each of the input pins 2, 4 in order to selectively output the video signal from one of the pins as an auxiliary analogue video signal.

The words "main" and "auxiliary" are used for clarity of description but it should be understood that they do not relate to a feature of the video signal itself.

The output of the first input selector 6 is connected with interposition of an analogue switch 34 to the CVBS output pin (referenced as 19 on FIG. 1, the reference number of the pins of the Scart connector being the normalised reference number) of a Scart connector 10. As a consequence, when a display (for instance a TV set) is plugged to the (normalised) Scart connector, the video sequence represented by the main analogue video signal is displayed on the whole screen of the display.

The output of the second input selector 8 is connected to the input of a digital encoder 22. The digital encoder 22 generates a digital stream corresponding to the auxiliary analogue video signal. This means that the same video sequence is represented according to an analogue format (for instance CVBS) at the input of the digital encoder 22 and according to a digital format (for instance MPEG-II) at the output of the digital encoder 22. It can be pointed that the synchronisation information contained in the auxiliary analogue video signal is coded in the digital stream. The digital encoder 22 is implemented by the series association of a Philips SAA7118 video decoder and a NEC µPD61050 MPEG-II encoder. The digital encoder 22 is thus a possible source of a video digital stream.

The output of the digital encoder 22 is connected on the one hand to a medium interface 24 and on the other hand to a first input of a digital switch 26.

The medium interface 24 is meant to convert the digital (MPEG-II) stream it receives into a bit stream which is ready to be recorded on a medium 28, for instance a hard disk drive (HDD), a recordable optical disc or a tape (e.g. a D-VHS tape). The medium interface 24 can be implemented by a Philips SAA6700H bit-stream processor for a D-VHS VCR.

The digital switch 26 receives on a second input the digital stream output from the medium interface 24 when the medium 28 is read. The digital switch 26 is thus connected to two possible digital sources:
- a first digital source which comprises the medium interface 24 and which can be referred to more generally as media player;
- a second digital source which is the output of the digital encoder 22.

The digital switch 26 transmits the digital stream from the selected digital source, i.e. from one of its input, to a video encoder 30, for instance a Sti5500 (which also includes a MPEG-II decoder and a micro-controller). The video encoder allows to generate analogue video signals based on a received video digital stream, here a MPEG-II stream called transport stream when read from a D-VHS tape and program stream when coming from a HDD or an optical disc.

Video encoders can generally provide analogue video signals according to a plurality of formats, notably CVBS, S-Video and RGB (red, green, blue on 3 wires with respective ground wires). Only the CVBS and RGB outputs are represented on FIG. 1 for convenience. The CVBS output is connected to pin 19 of the Scart connector 10 with interposition of the analogue switch 34. Each of the R-output, G-output and B-output of the video encoder 30 is connected to the corresponding pin (respectively 15, 11, 7 on FIG. 1) of the Scart connector 10. Similarly, a fast-blanking signal generated by the video encoder 30 is sent on a FB-output to the Scart connector 10 on a pin 16.

The video encoder 30 has the ability to generate from the video digital stream it receives a video sequence coded according to the RGB format which covers only a reduced part of the screen of the display. (This means the video encoder 30 can produce scaled-down RGB signals of the video digital stream.)

A synchronisation separator 32 receives the main analogue video signal from the first input selector 6, extracts a synchronisation signal (precisely a composite synchronisation signal comprising a horizontal synchronisation information and a vertical synchronisation information) from the main analogue video signal and transmits the synchronisation signal to the video encoder 30.

The above-described video apparatus can operate in various modes, some of which are explained below with further details.

In a first mode, the video digital stream (MPEG program stream) from the media player (i.e. from the medium 28 via the medium interface 24) is transmitted to the video encoder 30 by the digital switch 26. The video encoder 30 generates a CVBS signal which synchronisation information is taken from the synchronisation information coded in the video digital stream. The CVBS signal is forwarded to pin 19 of the Scart connector 10 via the analogue switch 34 to be viewed on another apparatus (for instance a TV set) linked to the Scart connector 10. This first mode thus allows to reproduce a video sequence from the digital medium 28 on the whole screen of the TV set (thanks to the use of the CVBS pin 19 of the Scart connector).

In a second mode, the video digital stream is also read from the media player and forwarded to the video encoder 30 by the digital switch 26; however, the video encoder 30 generates corresponding analogue video signals on its R, G, B, and FB outputs, possibly scaled down, which are synchronised with the synchronisation information extracted from the main analogue video signal by the synchronisation separator 32 as previously indicated. Concurrently, the analogue switch 34 directs the main analogue video signal (output by the first input selector 6) to pin 19 of the Scart connector 10.

The video sequence reproduced by the media player can thus be superimposed on the main analogue video signal selected by input selector 6, in a picture-in-picture (PIP) fashion if scaled down.

In a third mode, when the video sequence from the second input selector 8 (auxiliary analogue video signal) is being recorded, the digital switch 26 can be controlled by the micro-processor (under instructions from the user) to forward the recorded digital video stream (generated by the digital encoder 22) to the video encoder 30, where the video sequence is scaled down and sent to the Scart connector 10 as RGB signals, synchronised with the main analogue video signal (as for the second mode) in order to be easily superimposed on the video sequence represented by the main analogue video signal.

This way of inserting a child picture in a parent picture can also be used in a fourth mode, when no recording takes place: the signal selected as auxiliary analogue video signal by the second input selector 8 is transmitted through the digital encoder 22, the digital switch 26 and the video encoder 30 where it is scaled down and sent to the Scart connector with synchronisation with the main analogue video signal (as previously explained) for superimposition on the main analogue video signal selected by the first input selector 6. The digital stream received by the medium interface 24 is ignored. The invention thus takes advantage of circuits of the video recorder/player to provide a PIP function even when no playing/recording occurs.

It should be noted that further digital sources can be used as a digital video source for instance a DV camera can be connected to the NEC µPD61050 MPEG encoder through a normalised IEEE1394 connector; similarly, a set-top box could be connected to the IEEE1394; an USB (universal serial bus) connector can also provide a JPEG (or any digitally coded) picture to the micro-controller included in the Sti5500 IC, the micro-controller then generating a digital video stream based on this picture; a modem can also be connected to the micro-controller whereby information from a remote-location (for instance from the Internet) can be received and converted into graphics in the form of a video digital stream by the micro-controller.

The video sequences represented by these various digital sources can thus be superimposed easily on the main analogue video signal thanks to the invention, without the need of a further dedicated circuit.

The invention is not limited to the embodiment described above. For instance, a vertical synchronisation signal and a horizontal synchronisation signal on 2 wires can be used instead of the composite synchronisation signal.

All the same, the RGB signals are not necessarily forwarded to a Scart connector: other types of connector can be used alternatively, the RGB signals can be sent to be superimposed on the CVBS signal directly, without interposition of a connector, like for instance in a so-called TV-DVD combo (apparatus including both a TV set and a DVD player).

What is claimed is:

1. Video apparatus comprising:
    a first digital source of a first video digital stream;
    a video encoder for generating analogue video signals based on said first video digital stream;
    an input for receiving first analogue video signals comprising synchronisation signals,
    a synchronization separator for separating a synchronisation signal Csync from said first analogue video signal, and for providing the synchronisation signal Csync to the video encoder,
    a second digital source of a second video digital stream,
    a digital switch for selectively connecting the input of the video encoder with the outputs of the first digital source or the second digital source,
    the video encoder having means to generate second analogue video signals based on its input video digital stream and synchronised by said synchronisation signals, wherein said second analogue video signals are output for superimposition on said first analogue video signals.

2. A video apparatus according to claim 1, wherein said first analogue video signals are output on a CVBS pin of a Scart connector and wherein said second analogue video signals are output on RGB pins of the Scart connector.

3. A video apparatus according to claim 1, wherein said first digital source is a media player.

4. A video apparatus according to claim 1, wherein the video encoder comprises means for scaling down said video digital stream into said second analogue video signals.

5. A video apparatus according to claim 1, wherein said second digital source is a digital encoder.

6. A video apparatus according to claim 5, wherein said digital encoder converts an analogue video signal into said second video digital stream.

7. A video apparatus according to claim 5, wherein said digital encoder receives a digital stream from a DV camera or a set-top box.

8. A video apparatus according to claim 1, wherein a micro-controller provides said second digital source.

9. A video apparatus according to claim 8, wherein the micro-controller generates said second video digital stream based on data received from a modem or a serial bus.

10. Video player comprising:
    a media player generating a first video digital stream;
    a video encoder for generating analogue video signals based on said first video digital stream;
    an input for receiving first analogue video signals comprising synchronisation signals,
    a synchronisation separator for separating a synchronisation signal Csync from said first analogue video signal, and for providing the synchronization signal Csync to the video encoder,
    a Scart connector with a CVBS pin connectable to said input,
    a second digital source of a second video digital stream,
    a digital switch for selectively connecting the input of the video encoder with the outputs of the first digital source or the second digital source,
    the video encoder having means to generate second analogue video signals based on said second video digital stream and synchronised by said synchronisation signals,
    said second analogue video signals being output on RGB pins 7 of the scart connector, wherein said second analogue video signals are output for superimposition on said first analogue video signals.

* * * * *